United States Patent
Yanagi et al.

(10) Patent No.: US 12,526,179 B2
(45) Date of Patent: Jan. 13, 2026

(54) FIRST COMMUNICATION DEVICE AND NON-TRANSITORY COMPUTER-READABLE RECORDING MEDIUM STORING COMPUTER-READABLE INSTRUCTIONS FOR SECOND COMMUNICATION DEVICE

(71) Applicant: BROTHER KOGYO KABUSHIKI KAISHA, Nagoya (JP)

(72) Inventors: Satoru Yanagi, Obu (JP); Satoshi Matsushita, Nagoya (JP); Munehisa Matsuda, Nagoya (JP); Kiyotaka Ohara, Nagoya (JP); Katsunori Enomoto, Toyokawa (JP); Yuki Yada, Kuwana (JP); Kyohei Mori, Nagoya (JP); Hideki Nogawa, Nagoya (JP); Tetsuya Okuno, Nagoya (JP); Koki Izumi, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/360,059

(22) Filed: Jul. 27, 2023

(65) Prior Publication Data
US 2024/0037075 A1   Feb. 1, 2024

(30) Foreign Application Priority Data
Jul. 29, 2022   (JP) ................. 2022-121711

(51) Int. Cl.
*H04L 41/0213*   (2022.01)
*H04L 41/28*   (2022.01)
(Continued)

(52) U.S. Cl.
CPC .......... *H04L 41/0213* (2013.01); *H04L 41/28* (2013.01); *H04L 69/18* (2013.01); *G06F 16/21* (2019.01)

(58) Field of Classification Search
CPC ............................ G06F 16/21; H04L 41/0213
See application file for complete search history.

(56) References Cited

U.S. PATENT DOCUMENTS 6,182,157 B1 *   1/2001   Schlener ............... H04L 41/046
                                                           709/224
9,413,615 B1 *   8/2016   Singh .................. H04L 41/0681
(Continued)

FOREIGN PATENT DOCUMENTS

JP       2004-264995 A       9/2004
JP       2008-065833 A       3/2008

OTHER PUBLICATIONS

Extended European Search Report dated Dec. 6, 2023 from related EP 23 18 7903.2.
(Continued)

*Primary Examiner* — Courtney Harmon
(74) *Attorney, Agent, or Firm* — Scully, Scott, Murphy & Presser, P.C.

(57) ABSTRACT

A first communication device may include: a database configured to, for each of a plurality of OIDs of MIB, store the OID in association with a setting value; and a controller, wherein the controller is configured to: receive a writing request from a second communication device by using a second communication scheme different from a first communication scheme including SNMP, the writing request including an OID and a setting value, and the second communication scheme including at least one of encryption of communication data and authentication of a sender of the writing request; and in a case where the writing request is received from the second communication device, write the setting value included in the writing request in the database in association with the OID included in the writing request.

11 Claims, 10 Drawing Sheets

(51) Int. Cl.
*H04L 69/18* (2022.01)
*G06F 16/21* (2019.01)

(56) References Cited

U.S. PATENT DOCUMENTS

| | | | | |
|---|---|---|---|---|
| 2003/0182367 A1* | 9/2003 | Ohara | ............ | G06F 3/1204 |
| | | | | 709/203 |
| 2004/0230692 A1 | 11/2004 | Tachiyama et al. | | |
| 2008/0065784 A1 | 3/2008 | Motoyama et al. | | |
| 2011/0295989 A1* | 12/2011 | Kiyoto | ............ | H04L 41/0226 |
| | | | | 709/223 |
| 2015/0324465 A1* | 11/2015 | Logan | ............ | G06F 16/2246 |
| | | | | 707/770 |
| 2018/0191740 A1* | 7/2018 | Decenzo | ............ | H04L 63/02 |

OTHER PUBLICATIONS

Li, Y., Huawei Technologies, Harrington, D., Huawei Technologies (USA); "Accessing MIBs using NETCONF; draft-li-ngo-access-mib-01.txt", Accessing MIBs Using Netconf; Draft-Li-Ngoaccess-MIB-01.TXT, Internet Engineering Task Force, IETF; Standardworkingdraft, Internet Society (ISOC) 4, Rue Des Falaises Ch-1205 Geneva, Switzerland, No. 1, Jun. 20, 2007, pp. 1-21.

Badra, M., Limos Laboratory, Luchuk A., Snmp Research, Inc., Schoenwaelder, J., Jacobs University, Bremen; "Using the NETCONF Protocol over Transport Layer Security (TLS); draft-ietf-netconf-rfc5539bis-02.txt", Using the Netconf Protocol Over Transport Layer Security (TLS); Draft-IETFNETCONF-RFC5539BIS-02.TXT, Internet Engineering Task Force, IETF; Standardworkingdraft, Internet Society (ISOC) 4, Rue Des Falaises Ch-1205 GENEVA.

Vaughn, K., Ed., Trevilon LLC; "Transport Layer Security 1-6 Verion 1.3 (TLS 1.3) Transport Model for the Simple Network Management Protocol Version 3 (SNMPv3) draft-vaughntlstm-update-00; draft-vaughn-tlstmupdate-00.txt", Transport Layer Security Verion 1.3 (TLS 1.3) Transport Model for the Simple Network Management Protocol Version 3 (SNMPV3) DRAFTVAUGHN-TLSTM-UPDATE-00; Draft-Vaughn-TLSTMUPDATE-00.TXT; Internet-Ora, Mar. 29, 2021, pp. 1-70.

* cited by examiner

(First Embodiment)

FIRST COMMUNICATION DEVICE AND NON-TRANSITORY COMPUTER-READABLE RECORDING MEDIUM STORING COMPUTER-READABLE INSTRUCTIONS FOR SECOND COMMUNICATION DEVICE

REFERENCE TO RELATED APPLICATION

This application claims priority from Japanese Patent Application No. 2022-121711 filed on Jul. 29, 2022. The entire content of the priority application is incorporated herein by reference.

BACKGROUND ART

A peripheral device with an MIB (Management Information Base) database is known. SNMP (Simple Network Management Protocol) is used to acquire setting values in the MIB database and to write setting values in MIB.

DESCRIPTION

The disclosure herein provides techniques for securely writing setting values in an MIB database.

A first communication device disclosed herein may comprise a database configured to, for each of a plurality of object IDs (OIDs) of Management Information Base (MIB), store the OID in association with a setting value; and a controller. The controller may be configured to: receive a writing request from a second communication device by using a second communication scheme different from a first communication scheme including Simple Network Management Protocol (SNMP), the writing request including an OID and a setting value, and the second communication scheme including at least one of encryption of communication data and authentication of a sender of the writing request; and in a case where the writing request is received from the second communication device, write the setting value included in the writing request in the database in association with the OID included in the writing request.

Further disclosed herein is a non-transitory computer-readable recording medium storing computer-readable instructions for a second communication device. The computer-readable instructions, when executed by a processor of the second communication device, may cause the second communication device to: send a writing request to a first communication device by using a second communication scheme different from a first communication scheme including Simple Network Management Protocol (SNMP), the writing request including an object ID (OID) of Management Information Base (MIB) and a setting value, the second communication scheme including at least one of encryption of communication data and authentication of a sender of the writing request, and wherein in a case where the first communication device receives the writing request from the second communication device, the first communication device writes the setting value included in the writing request in an MIB database in association with the OID included in the writing request.

Since the second communication scheme includes at least one of encryption of communication data and authentication of sender of the writing request, the second communication scheme is more secure than the first communication scheme including SNMP. According to the above-described first communication device and non-transitory computer-readable recording medium, the writing request is communicated using the relatively secure second communication scheme. The setting value thus can be securely written in the MIB database.

Computer program for implementing the above-described first communication device and a non-transitory computer-readable recording medium storing this computer program are also novel and useful. Further, a method performed by the above-described first communication device is novel and useful. Also, the above-described second communication device itself and a computer program for implementing the above-described second communication device are novel and useful. Further, a method performed by the above-described second communication device is novel and useful.

Figure 1:
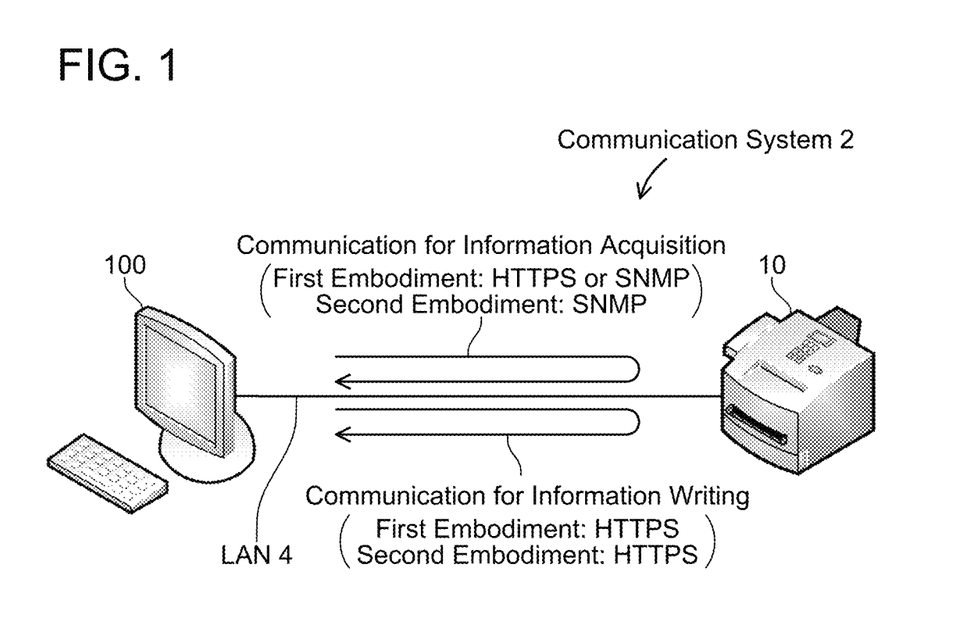
FIG. 1 illustrates a configuration of a communication system.

(First Embodiment) (Configuration of Communication System 2; FIG. 1) As illustrated in FIG. 1, a communication system 2 comprises a printer 10 and a terminal device 100. The devices 10, 100 are connected to a LAN (local area network) 4 and are communicable with each other via the LAN 4. The LAN 4 may be a wired LAN or a wireless LAN. In the present embodiment, the printer 10 writes and sends information according to requests from the terminal device 100. In the present embodiment, an acquisition request for acquiring information is a command according to HTTPS (Hypertext Transfer Protocol Secure) or SNMP (Simple Network Management Protocol). Further, in the present embodiment, a writing request for writing information is a command according to HTTPS.

Figure 2:
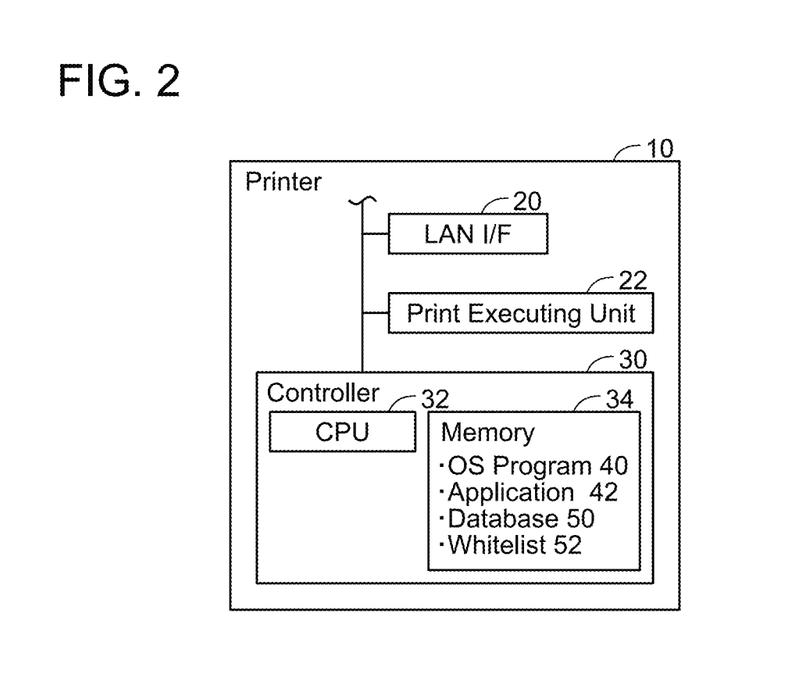
FIG. 2 illustrates a block diagram of a printer.

(Configuration of Printer 10; FIG. 2) The printer 10 is a peripheral device (e.g., a peripheral device of the terminal device 100) configured to execute a print function. In a modification, the printer 10 may be a multifunctional device configured to execute a scan function, a FAX function, etc. in addition to the print function. The printer 10 comprises a LAN interface 20, a print executing unit 22, and a controller 30. The units 20 to 30 are connected to a bus line (reference sign omitted). Hereinafter, "interface" may be abbreviated as "I/F".

The LAN I/F 20 is for communication via the LAN 4 and is connected to the LAN 4. The print executing unit 22 comprises a print mechanism of an inkjet scheme, laser scheme, or the like.

The controller 30 comprises a CPU 32 and a memory 34. The memory 34 is configured of a volatile memory and a non-volatile memory. The CPU 32 executes various processes according to programs 40, 42 stored in the memory 34. An OS (operating system) program 40 is a program for controlling basic operation of the printer 10. An application 42 is a program for accessing a database 50, which will be described later. The memory 34 further stores the database 50 and a whitelist 52. The programs 40, 42, the database 50, and the whitelist 52 are stored, for example, in the non-volatile memory of the memory 34.

The database 50 stores various information (referred to as "MIB values" hereinafter) of the printer 10. The MIB values indicate, for example, a remaining amount in a consumable article, MAC address, name (i.e., user name), IP address, installed location, access destination, error history, status (print in progress, standby, etc.), print setting (e.g., default resolution for print), etc. of the printer 10. The database 50 stores the above-mentioned various information in a tree structure (i.e., hierarchical structure). This collection of various data in the tree structure is referred to as "MIB (Management Information Base)". Specifically, the database 50 stores a content and an OID (object ID) in association with each MIB value. The content is a character string indicating the meaning of the MIB value. The OID is an identifier for identifying the MIB value.

The whitelist 52 is a list of OIDs. The whitelist 52 is used in processes of FIGS. 10 and 11, which will be described later. The whitelist 52 may have a different data formation from that of the database 50 or may be a part of the database 50.

Figure 3:
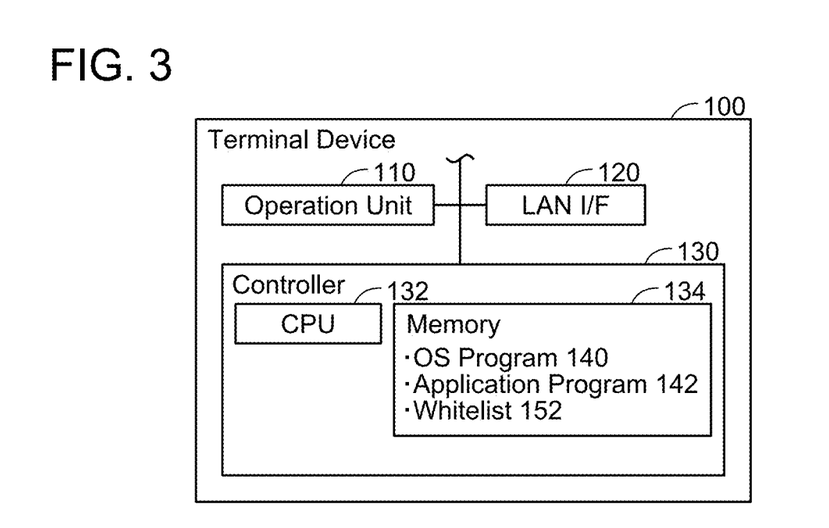
FIG. 3 illustrates a block diagram of a terminal device.

(Configuration of Terminal Device 100; FIG. 3) The terminal device 100 is a user terminal such as a desktop PC, a laptop PC, a tablet PC, a mobile phone (e.g., smartphone), or the like. The terminal device 100 comprises an operation unit 110, a LAN I/F 120, and a controller 130. The operation unit 110 comprises a plurality of keys. A user can input various instructions to the terminal device 100 by operating the operation unit 110. The operation unit 110 may comprise a so-called touch screen. The LAN I/F 120 is connected to the LAN 4.

The controller 130 comprises a CPU 132 and a memory 134. The CPU 132 executes various processes according to programs 140, 142 stored in the memory 134. An OS program 140 is a program for controlling basic operation of the terminal device 100. An application 142 is a program for sending the acquisition request and the write request to the printer 10. The application 142 is provided, for example, by the vendor of the printer 10. The application 142 is downloaded, for example, from a server on the Internet.

The memory 134 further stores a whitelist 152. The whitelist 152 is a list of OIDs. The whitelist 152 is stored in the memory 134 by the application 142. The whitelist 152 is used in processes of FIGS. 7 and 8, which will be described later. In the present embodiment, the whitelist 152 is identical to the whitelist 52 of the printer 10. In a modification, the whitelist 152 may be different from the whitelist 52. For example, one or more OIDs included in the whitelist 152 may not be included in the whitelist 52.

Figure 4:
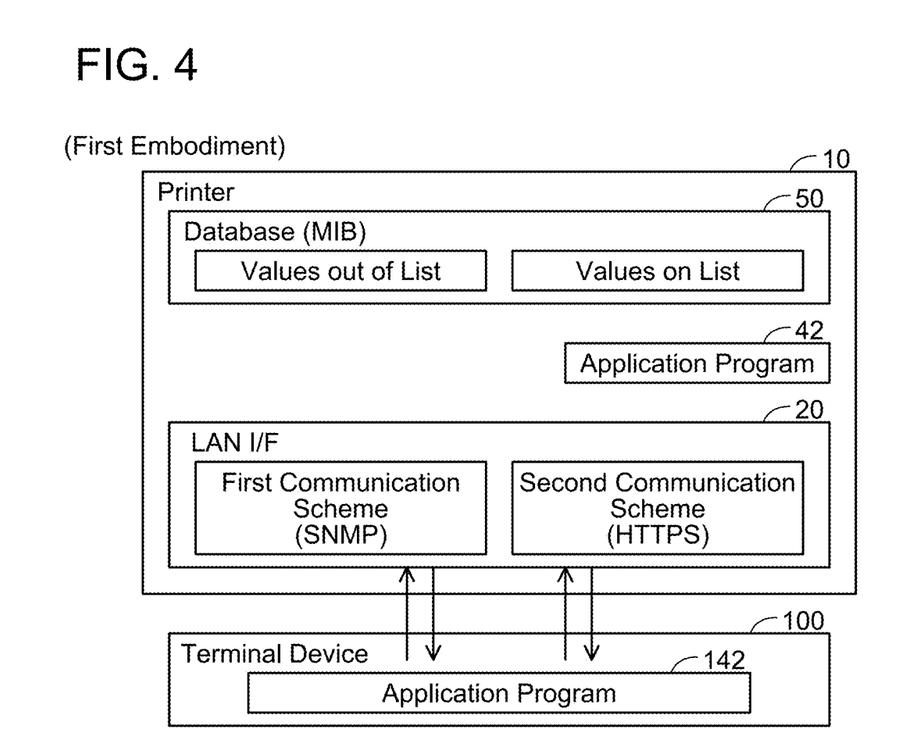
FIG. 4 illustrates communication protocols between the printer and the terminal device.
Figure 5:
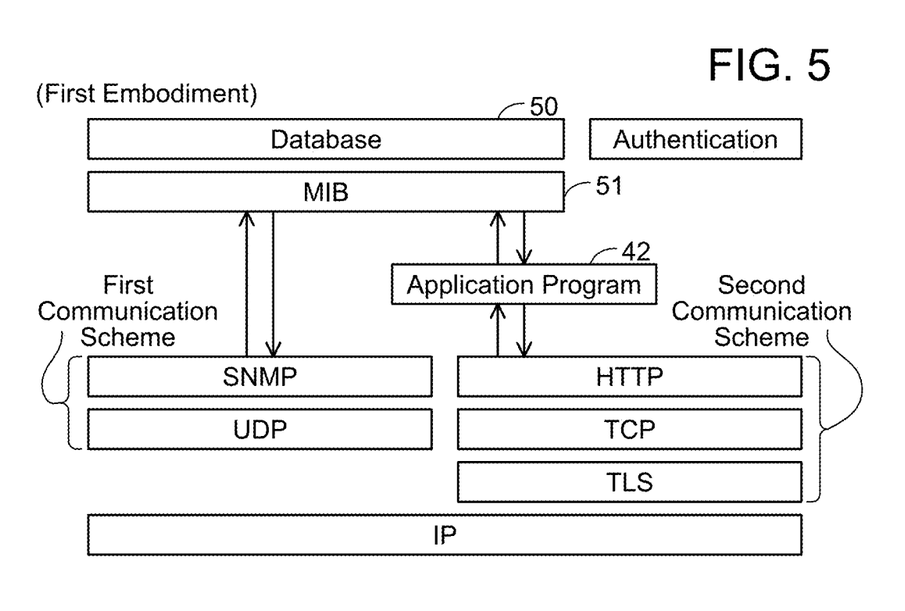
FIG. 5 illustrates the OSI reference model and MIB.

(Communication Protocols between Printer 10 and Terminal Device 100; FIG. 4, FIG. 5) As a communication protocol for communicating MIB values of the printer 10 between the printer 10 and the terminal device 100, a protocol according to UDP (User Datagram Protocol) in the transport layer of the OSI (Open Systems Interconnection) reference model is widely known. Specifically, SNMP (Simple Network Management Protocol) is known. SNMP is SNMPv1 or SNMPv2. It can be contemplated that not only UDP but also a communication protocol according to TCP (Transmission Control Protocol) in the transport layer of the OSI reference model is used as a communication protocol for communicating MIB values. Specifically, it can be contemplated that HTTPS is used. This is because HTTPS is more secure than SNMPv1 and SNMPv2 since it employs user authentication and encryption of communication data. Thus, it is possible to prevent MIB values of the printer 10 from being illicitly written or acquired by a third party.

As illustrated in FIG. 4, the LAN I/F 20 can communicate with the terminal device 100 by selectively using one of a first communication scheme including SNMP and a second communication scheme including HTTPS. The application 42 of the printer 10 controls communication using the second communication scheme. Although details will be described later, the application 42 executes, via an MIB interface 51, communication of MIB values stored in association with the OIDs on the whitelist 52 among the MIB values in the database 50. On the other hand, MIB values stored in association with OIDs that are not on the whitelist 52 among the MIB values in the database 50 are communicated according to SNMP via the MIB interface 51.

As illustrated in FIG. 5, the first communication scheme including SNMP and UDP is an upper layer of IP (Internet Protocol) in the network layer of the OSI reference model. Here, SNMP is the application layer of the OSI reference model. SNMP accesses the database 50, via the MIB interface 51, in accordance with a command according to SNMP received from the terminal device 100. Specifically, SNMP acquires information from the database 50 via the MIB interface 51. SNMP then sends the information acquired from the database 50 to the terminal device 100 as a response to the command according to SNMP.

Further, as illustrated in FIG. 5, the second communication scheme including HTTP, TCP, and TLS (Transport Layer Security) is also an upper layer of IP. Here, HTTP is the application layer of the OSI reference model and TLS is the session layer of the OSI reference model. TLS is a protocol for encrypting communication data and is a next-generation standard of SSL (Secure Socket Layer). HTTPS is a combination of HTTP and TLS (or SSL). Normally, commands and responses thereto according to HTTPS use general formats such as JSON (Java Script Object Notation), XML (Extensible Markup Language), etc. In the present embodiment, commands and responses thereto according to HTTPS in the JSON format are communicated between the printer 10 and the terminal device 100. In a modification, the MXL format may be used instead of the JSON format.

HTTP executes authentication using a user name (i.e., ID) and a password. The memory 34 of the printer 10 stores information "Authentication (e.g., a user name and a password)" to be used for HTTP authentication. Here, HTTP supports basic authentication and digest authentication. The basic authentication is a scheme for coding a user name and a password by Base64 and sending it. The digest authentication is a scheme for hashing a user name and a password and sending it. In the basic authentication, a plain text generated by coding a user name and a password by Base64 is sent, while in the digest authentication, a value generated by hashing a user name and a password is sent. Thus, the digest authentication is more secure than the basic authentication. In the present embodiment, the digest authentication is used. In a modification, the basic authentication may be used.

As illustrated in FIG. 5, the application 42 of the printer 10 is an upper layer of HTTP. The application 42 interprets what is described in the JSON format included in a command according to HTTPS received from the terminal device 100 and accesses the database 50 via the MIB interface 51. Further, the application 42 describes a result of the access to the database 50 via the MIB interface 51 (e.g., information in the database 50) in the JSON format to generate a response.

Figure 6:
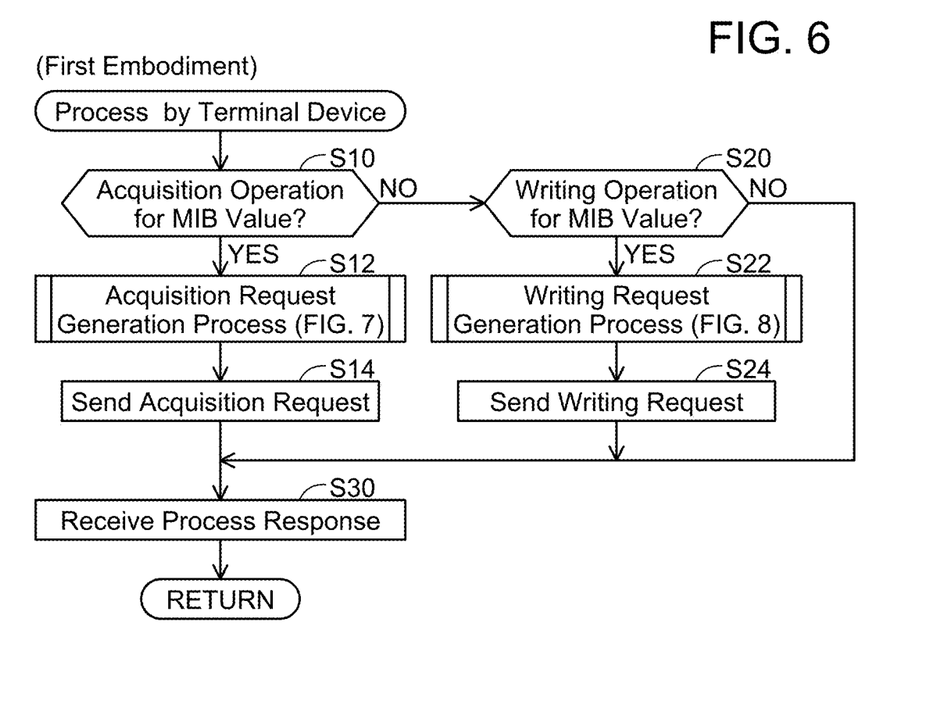
FIG. 6 illustrates a flowchart of a process by the terminal device.

(Process by Terminal Device 100; FIG. 6) Referring to FIG. 6, a process executed by the CPU 132 of the terminal device 100 according to the application 142 is described. The process of FIG. 6 is triggered by activation of the application 142.

The CPU 132 monitors in S10 whether an acquisition operation for acquiring an MIB value of the printer 10 is performed at the operation unit 110 and monitors in S20 whether a writing operation for writing an MIB value in the printer 10 is performed at the operation unit 110. The acquisition operation includes an operation of designating one or more items from among a plurality of items (i.e., a plurality of contents) corresponding to a plurality of MIB values of the printer 10. The writing operation includes an operation of designating one or more items corresponding to one or more MIB values (i.e., IP address, setting values of print setting, etc.) to be written in the printer 10, and an operation of inputting, for each of the designated one or more items, an MBI value to be written in the printer 10. The acquisition operation and the writing operation are, for example, operations on screens displayed on a display (not illustrated) of the terminal device 100.

When the acquisition operation is performed at the operation unit 110 (YES in S10), the CPU 132 executes an acquisition request generation process (see FIG. 7) for generating an acquisition request in S12. An acquisition request is at least one of an acquisition request according to HTTP (referred to as "HTTP acquisition request" hereinafter) and an acquisition request according to SNMP (referred to as "SNMP acquisition request" hereinafter). The HTTP acquisition request is, for example, a command according to HTTP POST method that includes a header in which "X-HTTP-Method-Override "GET" is written (see FIG. 7). In a modification, the HTTP acquisition request may be a command according to HTTP GET method. The SNMP acquisition request is, for example, a command according to SNMP GET method.

In subsequent S14, the CPU 132 sends an acquisition request generated in the acquisition request generation process of S12 to the printer 10 via the LAN I/F 120 and the LAN 4. In case where the generated acquisition request is an HTTP acquisition request, HTTP user authentication is executed between the terminal device 100 and the printer 10. When the user authentication succeeds, a TLS session is established between the terminal device 100 and the printer 10. The HTTP acquisition request is sent to the printer 10 using the TLS session. That is, the HTTP acquisition request is encoded by TLS. On the other hand, in case where the generated acquisition request is an SNMP acquisition request, user authentication is not executed. Further, the SNMP acquisition request is not encoded.

In S30 following S14, the CPU 132 receives, via the LAN I/F 120 and the LAN 4, a process response as a response to the acquisition request sent in S14. Here, a process response to an HTTP acquisition request is encoded by TLS, whereas a process response to an SNMP acquisition request is not encoded. When S30 is completed, the CPU 132 returns to the monitoring in S10 and the monitoring in S20.

When the writing operation is performed at the operation unit 110 (YES in S20), the CPU 132 executes a writing request generation process for generating a writing request (see FIG. 8) in S22. A writing request is a command according to HTTP POST method.

Subsequent S24 is the same as S14 except that a writing request generated in S22 is sent to the printer 10. For sending of the writing request, HTTP user authentication is executed and the writing request is encoded by TLS.

In S30 following S24, the CPU 132 receives, via the LAN I/F 120 and the LAN 4, a process response as a response to the writing request sent in S24. The process response to the writing request is encoded by TLS.

Figure 7:
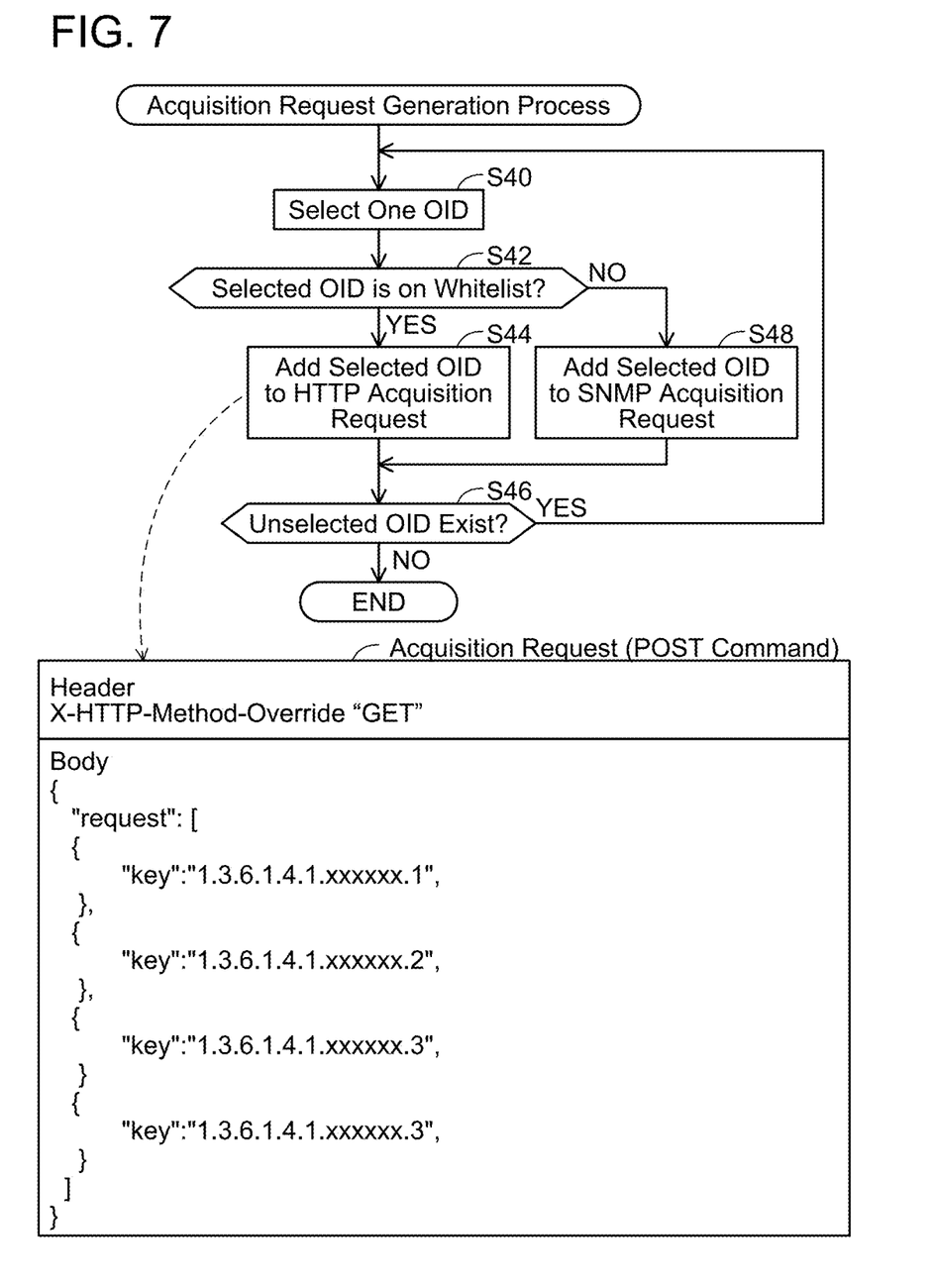
FIG. 7 illustrates a flowchart of an acquisition request generation process.

(Acquisition Request Generation Process; FIG. 7) The acquisition request generation process of S12 in FIG. 6 is described. In S40, the CPU 132 selects one OID from among one or more OIDs corresponding to the one or more contents selected by the acquisition operation (referred to as "one or more target OIDs" hereinafter).

In subsequent S42, the CPU 132 determines whether the one OID selected in S40 is on the whitelist 152. The whitelist 152 includes, for example, OIDs corresponding to relatively highly confidential MIB values. The OIDs on the whitelist 152 are, for example, OIDs of a private MIB.

When determining that the one OID selected in S40 is on the whitelist 152 (YES in S42), the CPU 132 adds the one OID selected in S40 to an HTTP acquisition request in S44. Specifically, as illustrated in FIG. 7, a combination of "key" and the OID (e.g., "1.3.6.1.4.1.xxxxxx.1") is written in the body of the HTTP acquisition request.

When determining that the one OID selected in S40 is not on the whitelist 152 (NO in S42), the CPU 132 adds the one OID selected in S40 to an SNMP acquisition request in S48. This OID is written in the body of the SNMP acquisition request (not illustrated).

When S44 or S48 is completed, the CPU 132 determines in S46 whether there is an unselected OID among the one or more target OIDs. When determining that there is an unselected OID among the one or more target OIDs (YES in S46), the CPU 132 returns to S40 and selects another OID.

When determining that there is no unselected OID among the one or more target OIDs (NO in S46), the CPU 132 terminates the process of FIG. 7.

Figure 8:
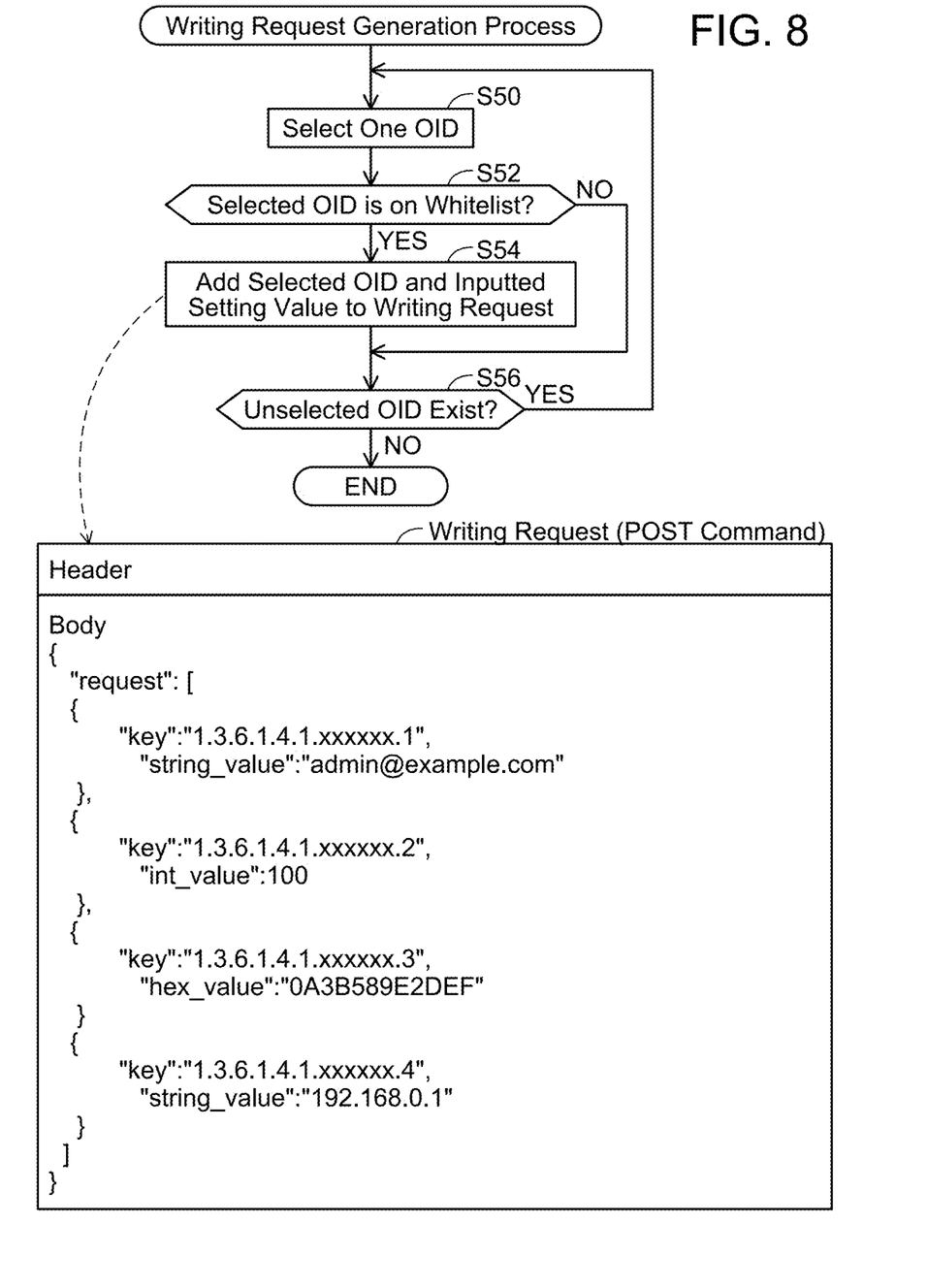
FIG. 8 illustrates a flowchart of a writing request generation process.

(Writing Request Generation Process; FIG. 8) The writing request generation process of S24 in FIG. 6 is described. S50, S52 are the same as S40, S42 in FIG. 7 except that one or more OIDs corresponding to the one or more MIB values inputted by the writing operation are used.

When determining that the one OID selected in S50 is on the whitelist 152 (YES in S42), the CPU 132 adds the one OID selected in S50 to a writing request in S54. Specifically, a combination of "key", the OID, and an MIB value to be written into the printer 10 (i.e., MIB value inputted by the user) is written in the body of the writing request according to HTTPS. When S54 is completed, the CPU 132 proceeds to S56.

When determining that the one OID selected in S50 is not on the whitelist 152 (NO in S42), the CPU 132 skips S54 and proceeds to S56. S56 is the same as S46 in FIG. 7. That is, whether an MIB value is permitted to be written or not is determined based on the whitelist 152.

Figure 9:
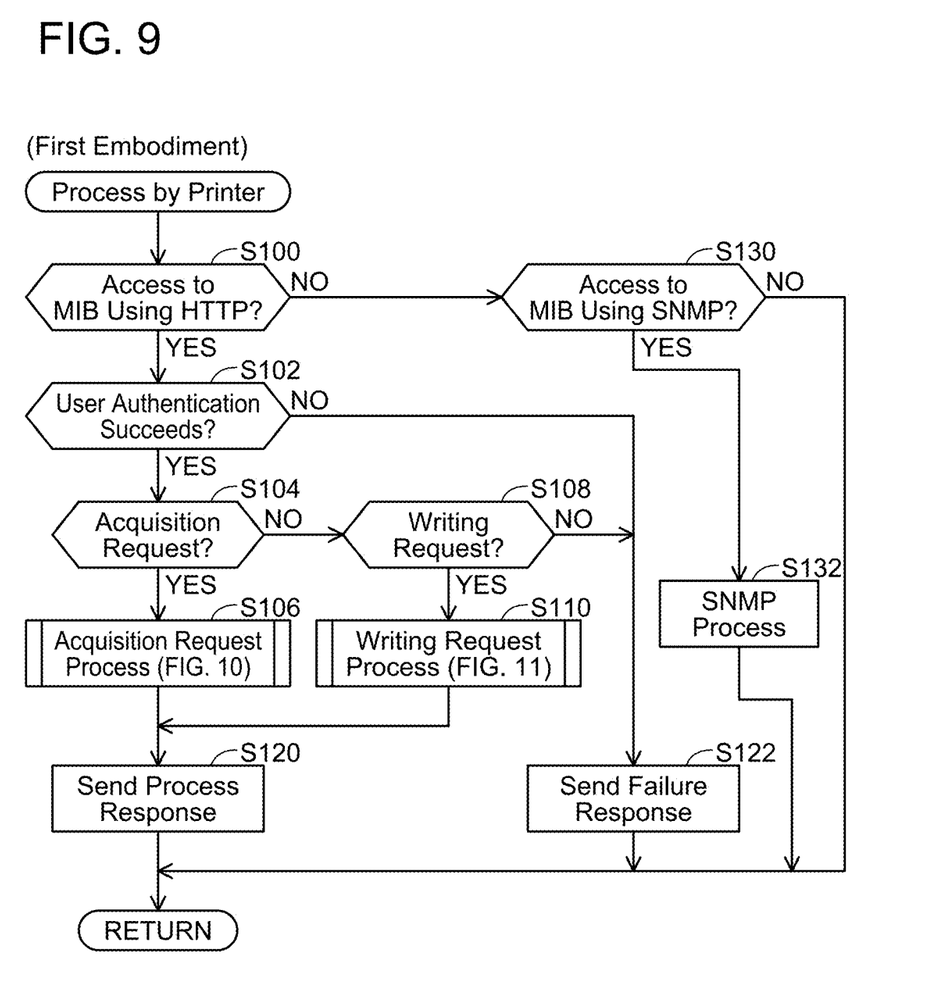
FIG. 9 illustrates a flowchart of a process by the printer.

(Process by Printer 10; FIG. 9) Referring to FIG. 9, a process executed by the CPU 32 of the printer 10 according to programs (e.g., 42) and protocols (e.g., SNMP) is described. The process of FIG. 9 is triggered by the printer 10 being turned on.

The CPU 32 monitors in S100 whether an event of accessing the MIB database 50 using HTTP occurs, and monitors in S130 whether an event of accessing the MIB database 50 using SNMP occurs. The event of S100 includes that the LAN I/F 20 receives a command according to HTTP from the terminal device 100. The event of S130 includes that the LAN I/F 20 receives a command according to SNMP.

When the event of S100 occurs (YES in S100), the CPU 32 executes S102 and subsequent steps according to the application 42. In S102, the CPU 32 determines whether HTTP user authentication between the terminal device 100 and the printer 10 has succeeded. When determining that the user authentication has succeeded (YES in S102), the CPU 32 proceeds to S104.

In S104, the CPU 32 determines whether the command according to HTTP received from the terminal device 100 (referred to as "received command" hereinafter) is an acquisition request. When determining that the received command is an acquisition request (YES in S104), the CPU 32 executes an acquisition request process (see FIG. 10) in S106, which is a process according to the acquisition request. In S120 following S106, the CPU 32 sends, via the LAN I/F 20 and the LAN 4, a process response generated in the acquisition request process of S106 to the terminal device 100. S120 may be executed according to the application 42 or HTTP. When S120 is completed, the CPU 32 returns to the monitoring in S100 and the monitoring in S130.

When determining that the received command is not an acquisition request (NO in S104), the CPU 32 determines in S108 whether the received command is a writing request. When determining that the received command is a writing request (YES in S108), the CPU 32 executes a writing request process (see FIG. 11) in S110, which is a process according to the writing request. In S120 following S110, the CPU 32 sends, via the LAN I/F 20 and the LAN 4, a process response generated in the writing request process of S110 to the terminal device 100.

When determining that the user authentication has failed (NO in S102) or when determining that the received command is neither of an acquisition request nor a writing request (e.g., the received command is a request that is not supported by the printer 10) (NO in S108), the CPU 32 skips S106 to S120 and proceeds to S122. In S122, the CPU 32 sends a failure response to the terminal device 100 via the LAN I/F 20 and the LAN 4. The failure response indicates that a process according to the received command has failed. When S122 is completed, the CPU 32 returns to the monitoring in S100 and the monitoring in S130.

When the event of S130 occurs (YES in S130), the CPU 32 proceeds to S132. In S132, the CPU 32 executes an SNMP process. The SNMP process includes sending, via the LAN I/F 20 and the LAN 4, a response to the command according to SNMP to the terminal device 100. For example, when the command according to SNMP is an SNMP acquisition request (see S48 in FIG. 7), the CPU 32 specifies each of one or more OIDs included in the SNMP acquisition request. The CPU 32 then acquires, for each of the specified one or more OIDs, an MIB value stored in association with the OID from the database 50. Then, the CPU 32 sends a response according to SNMP including the acquired one or more MIB values to the terminal device 100. When S132 is completed, the CPU 32 returns to the monitoring in S100 and the monitoring in S130.

Figure 10:
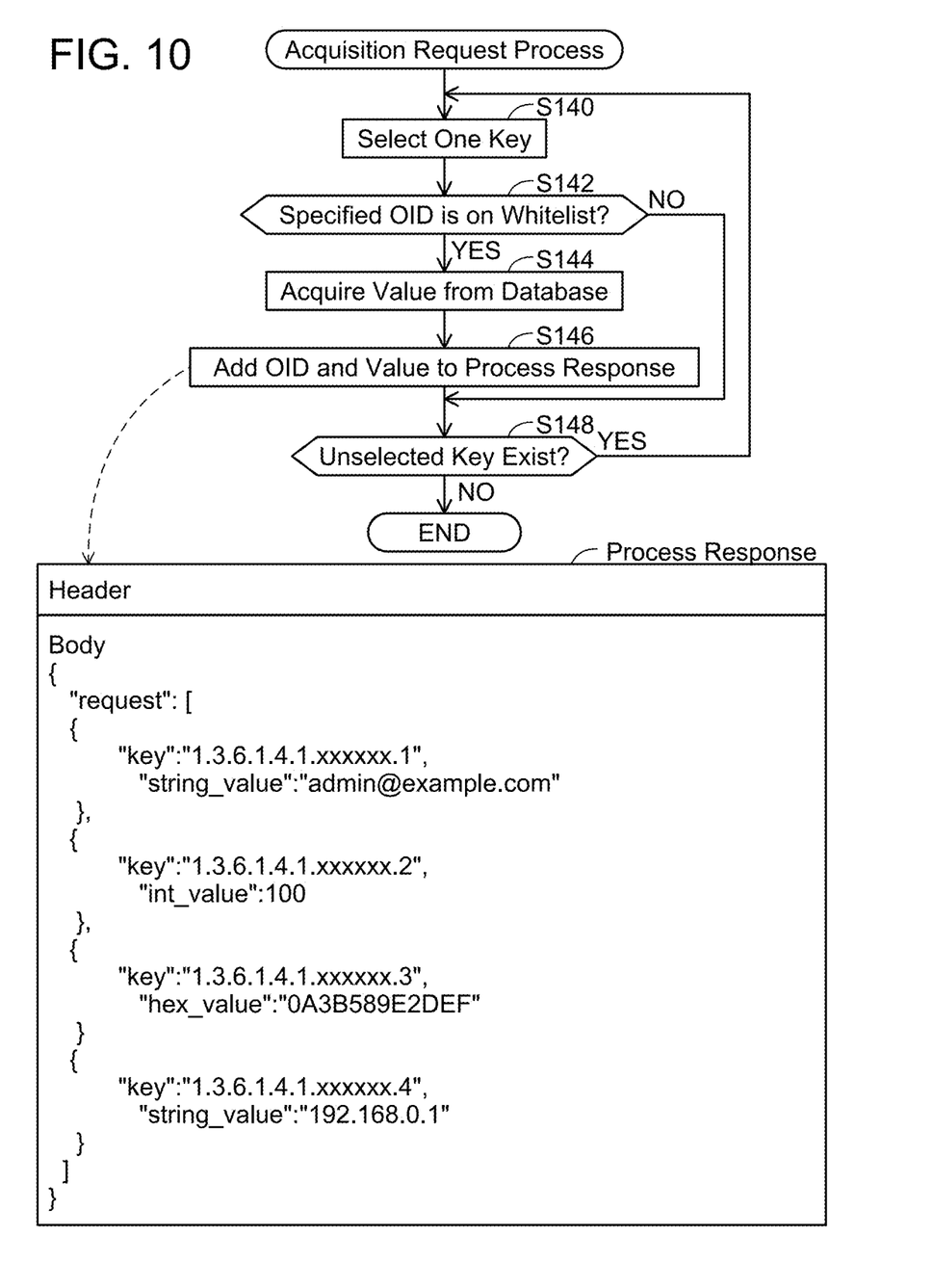
FIG. 10 illustrates a flowchart of an acquisition request process.

(Acquisition Request Process; FIG. 10) The acquisition request process of S106 in FIG. 9 is described. In S140, the CPU 32 selects one "key" from among one or more "keys" included in the HTTP acquisition request.

In subsequent S142, the CPU 32 specifies an OID associated with the one "key" selected in S140 from the HTTP acquisition request. The CPU 32 then determines whether the specified OID is on the whitelist 52. As with the whitelist 152 of the terminal device 100, the whitelist 52 includes OIDs corresponding to relatively highly confidential MIB values.

When determining that the specified OID is not on the whitelist 52 (NO in S142), the CPU 32 skips S144 and S146, which will be described later, and proceeds to S148. In S148, the CPU 32 determines whether there is an unselected "key" among the one or more "keys" included in the HTTP acquisition request. When determining that there is an unselected "key" among the one or more "keys" included in the HTTP acquisition request (YES in S148), the CPU 32 returns to S140 and selects another "key".

When determining that there is no unselected "key" among the one or more "keys" included in the HTTP acquisition request (NO in S148), the CPU 32 terminates the process of FIG. 10.

When determining that the specified OID is on the whitelist 52 (YES in S142), the CPU 32 acquires in S144, via the MIB interface 51, an MIB value stored in association with the specified OID from the database 50.

In S146, the CPU 32 adds the MIB value acquired in S144 to a process response to the HTTP acquisition request. Specifically, as illustrated in FIG. 10, a combination of "key", the specified OID (e.g., "1.3.6.1.4.1.xxxxxx.1"), and the acquired MIB value (e.g., e-mail address (account name "admin" and server name "example.com")) is written in the body of the process response. When S146 is completed, the CPU 32 proceeds to S148.

Figure 11:
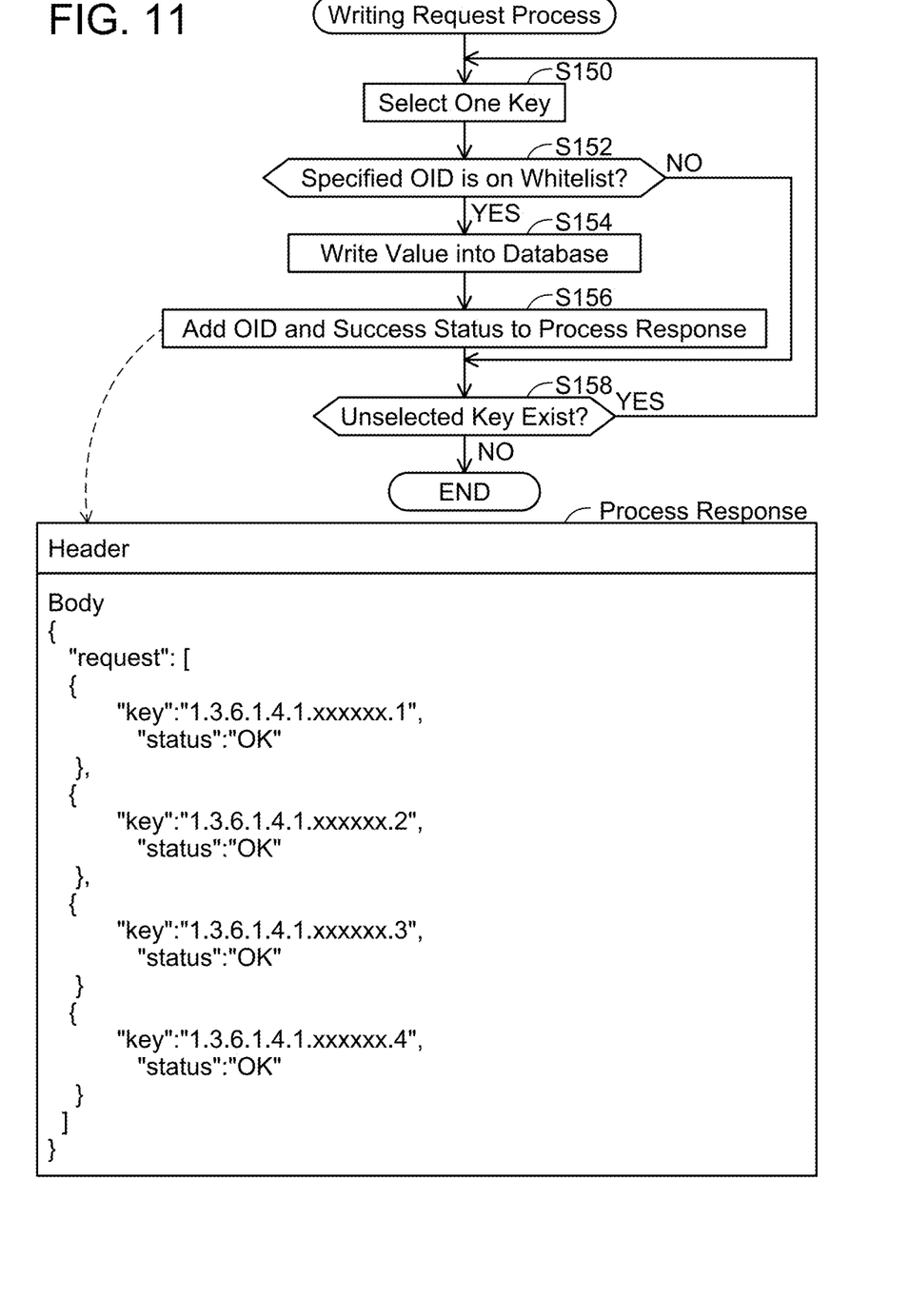
FIG. 11 illustrates a flowchart of a writing request process.

(Writing Request Process; FIG. 11) The writing request process of S110 in FIG. 9 is described. S150, S152 are the same as S140, S142 in FIG. 10 except that one or more "keys" included in the writing request are used.

When determining that the specified OID is on the whitelist 52 (YES in S152), the CPU 32 specifies an MIB value associated with the specified OID from the writing request in S154. The CPU 32 then writes, via the MIB interface 51, the specified MIB value in the database 50 in association with the specified OID. In other words, the MIB value stored in association with the specified OID in the database 50 is updated to the MIB value included in the writing request.

In subsequent S156, the CPU 32 adds a success status "OK" indicating that the specified MIB value has been successfully written to a process response to the writing request. Specifically, as illustrated in FIG. 11, a combination of "key", the specified OID (e.g., "1.3.6.1.4.1.xxxxxx.1"), and the success status "OK" is written in the body of the process response. When S156 is completed, the CPU 32 proceeds to S158. S158 is the same as S148 in FIG. 10 except that the one or more "keys" included in the writing request are used.

When determining that the specified OID is not on the whitelist 52 (NO in S152), the CPU 32 skips S154 and S156 and proceeds to S158. Whether an MIB value is permitted to be written or not is determined based on the whitelist 152.

(Effects of Present Embodiment) Since HTTPS includes user authentication and encryption of communication data, it is more secure than SNMP. In the present embodiment, communication of writing request can be executed using relatively secure HTTPS (S22 and S24 in FIGS. 6, S108 and S110 in FIG. 9). MIB values (i.e., setting values) can be securely written in the MIB database 50. Especially, MIB is widely known, and if the management means for the database 50 is switched to a means other than MIB, the general versatility may be decreased. In the present embodiment, secure writing can be realized without switching widely known MIB to another means. A decrease in the general versatility can be suppressed.

Further, in the present embodiment, communication of acquisition request can also be executed using relatively secure HTTPS (S12 and S14 in FIGS. 6, S104 and S106 in FIG. 9). MIB values in the database 50 can be securely sent to the terminal device 100.

A comparative example can be contemplated in which S48 in FIG. 7 (sending of SNMP acquisition request) is not executed. In this comparative example, the terminal device 100 cannot receive MIB values corresponding to OIDs that are not on the whitelist 152 among the one or more items designated in S10 of FIG. 6. In contrast, in the present embodiment, the terminal device 100 can receive MIB values corresponding to OIDs that are not on the whitelist 152 (e.g., MIB values with relatively low confidentiality) using SNMP. Convenience for the user of the terminal device 100 is improved. In a modification, the above-described comparative example may be employed.

Further, a comparative example can be contemplated in which S130 and S132 in FIG. 9 are not executed. In this comparative example, the printer 10 does not send a response to the SNMP acquisition request from the terminal device 100. MIB values corresponding to the items designated by the user may not be acquired. In contrast, in the present embodiment, the SNMP process in which a response to the SNMP acquisition request is sent is executed. Convenience for the user of the terminal device 100 is improved. In a modification, the above-described comparative example may be employed.

Further, a comparative example can be contemplated in which the determination using the whitelist 152 (S42 in FIG. 7, S52 in FIG. 8) and the determination using the whitelist 52 (S142 in FIG. 10, S152 in FIG. 11) are not executed. In this comparative example, MIB values corresponding to OIDs that are not on the whitelist 152, namely the MIB values with relatively low confidentiality, are also encoded by HTTP. In contrast, in the present embodiment, MIB values with relatively low confidentiality are communicated with the terminal device 100 without being encoded. In the present embodiment, unnecessary encryption of MIB values with relatively low confidentiality can be suppressed. In a modification, the above-described comparative example may be employed.

Further, a comparative example can be contemplated in which a blacklist is used instead of the whitelists 52 and 152. For example, it can be contemplated that a new OID is added to the database 50. In order to prohibit communication of an MIB value corresponding to the new OID, the new OID needs to be added to the blacklist. Without the addition of the new OID to the blacklist, the MIB value corresponding to the new OID may be leaked. In contrast, in the present embodiment, the MIB value corresponding to the new OID is not communicated unless the new OID is added to the whitelists. The leak of the MIB value corresponding to the new OID can be prevented. In a modification, the above-described blacklist may be used.

Further, the printer 10 of the present embodiment may have a function of permitting writing in the database 50 in accordance with a writing request according to SNMP. In the present embodiment, use of this function is not permitted.

(Correspondence Relationships) The printer 10, the memory 34, and the database 50 are examples of "first communication device", "memory", and "database", respectively. The whitelist 52 is an example of "second list". The terminal device 100 and the whitelist 152 are examples of "second communication device" and "fourth list", respectively. The HTTP acquisition request is an example of "second acquisition request".

S108 and S110 in FIG. 9 are examples of "receive a writing request from a second communication device" and "write the setting value included in the writing request in the database", respectively. S24 in FIG. 6 is an example of "send a writing request to a first communication device".

(Second Embodiment) (Configuration of Communication System 2; FIG. 1) The configuration of the communication system 2 is the same as that of the first embodiment. In the present embodiment, an acquisition request is a command according to SNMP and a writing request is a command according to HTTPS. In the present embodiment, the application 42 controls communication using the second communication scheme.

Figure 13:
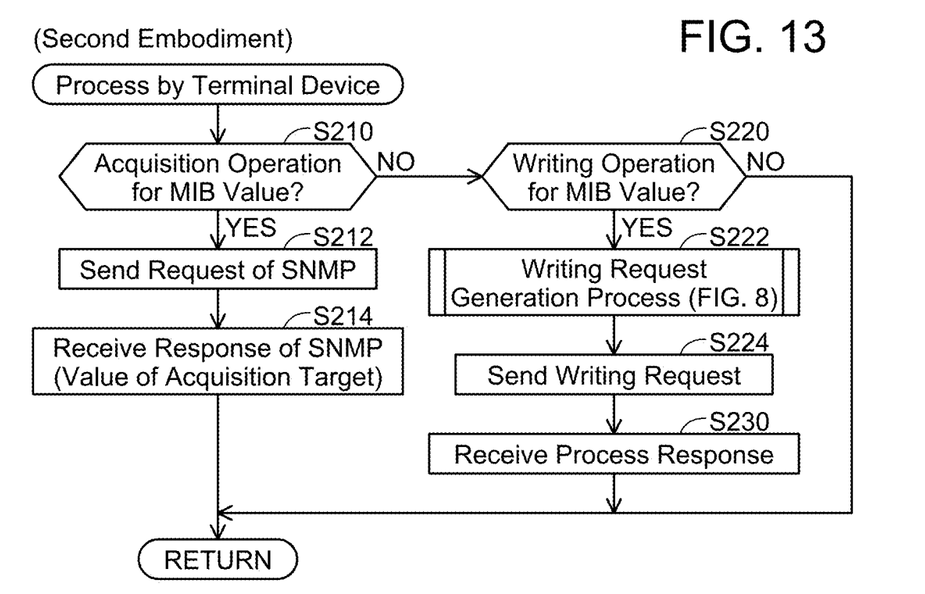
FIG. 13 illustrates a flowchart of a process by the terminal device.

(Process by Terminal Device 100; FIG. 13) Monitoring in S210 and monitoring in S220 are the same as the monitoring in S10 and the monitoring in S20 in FIGS. 6. S222 to S230 executed when the writing operation is performed at the operation unit 110 (YES in S220) are the same as S22 to S30 in FIG. 6.

When the acquisition operation is performed at the operation unit 110 (YES in S210), the CPU 132 sends an SNMP acquisition request to the printer 10 via the LAN I/F 120 and the LAN 4 in S212. The SNMP acquisition request in S212 includes OIDs corresponding to all contents selected by the acquisition operation.

In subsequent S214, the CPU 132 receives a process response to the request in S212 via the LAN I/F 120 and the LAN 4. The process response in S214 includes, for each of all the OIDs included in the SNMP acquisition request in S212, the OID and an MIB value in the database 50 corresponding to the OID. When S214 is completed, the CPU 132 returns to the monitoring in S210 and the monitoring in S220.

Figure 14:
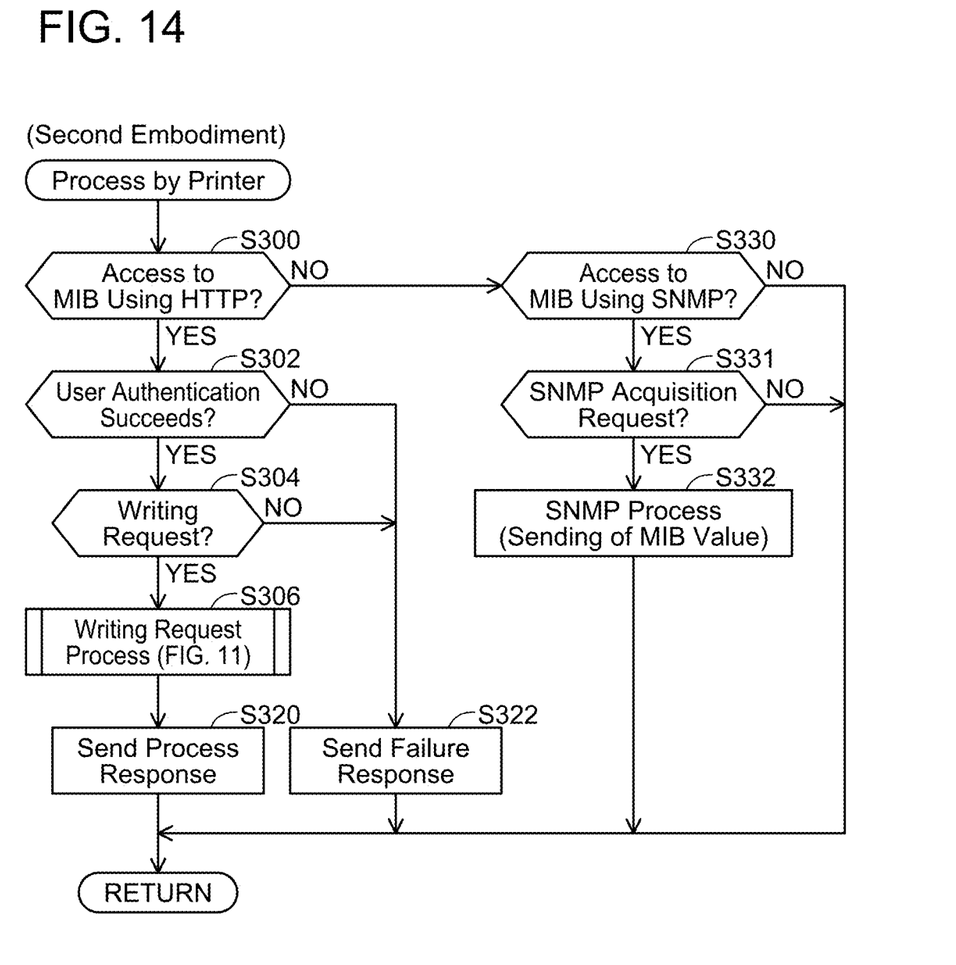
FIG. 14 illustrates a flowchart of a process by the printer.

(Process by Printer 10; FIG. 14) S300, S302, S304, S330 are the same as S100, S102, S108, S130 in FIG. 9. In the present embodiment, when determining that the command according to HTTP received from the terminal device 100 is a writing request (YES in S304), the CPU 32 proceeds to S306 and S320. S306 and S320 are the same as S110 and S120 in FIG. 9.

When determining that the command according to HTTP received from the terminal device 100 is not a writing request (NO in S304), the CPU 32 proceeds to S322. S322 is the same as S122 in FIG. 9. That is, when a request other than a writing request (e.g., HTTP acquisition request) is received, a process according to that request is not executed and a failure response is sent to the terminal device 100.

When an event of accessing the MIB database 50 using SNMP occurs (S330), the CPU 32 proceeds to S331. In S331, the CPU 32 determines whether the command according to SNMP received from the terminal device 100 is an SNMP acquisition request. When determining that the command received from the terminal device 100 is an SNMP acquisition request (YES in S331), the CPU 32 proceeds to S332. S332 is the same as S132 in FIG. 9.

When determining that the command received from the terminal device 100 is not an SNMP acquisition request (NO in S331), the CPU 32 skips S332 and terminates the process of FIG. 14. For example, when the command received from the terminal device 100 is a writing request according to SNMP, the CPU 32 does not execute the SNMP process according to the writing request according to SNMP. It is possible to suppress an MIB value from being written using communication according to SNMP.

(Effects of Present Embodiment) In the present embodiment, as with the first embodiment, MIB values can be securely written in the MIB database 50 using HTTPS.

In the present embodiment, HTTPS is not used to acquire MIB values in the printer Writing of MIB values affects the operation of the printer 10 more significantly than acquisition of MIB values. In the preset embodiment, writing, which affects the operation of the printer 10 more significantly, is securely executed, whereas acquisition, which affects the operation of the printer 10 less significantly, is executed using conventional SNMP to suppress a decrease in user convenience. In the present embodiment, both of secure communication and suppression of decrease in user convenience can be achieved.

The determinations using the whitelists 52 and 152 (S52 in FIG. 8, S152 in FIG. 11) are executed in the present embodiment as well. Whether MIB values are permitted to be written or not can be set based on the whitelists 52 and 152. For example, OIDs on the whitelists 52 and 152 include OIDs corresponding to personal information (e.g., an address list, etc.), an IP address, etc.

In the present embodiment, the whitelists 52 and 152 are used for a writing request according to HTTPS but are not used for an acquisition request according to SNMP (S212 in FIG. 13). As compared to the case of writing MIB values, the user is not limited with respect to acquisition of MIB values. User convenience is improved.

Figure 12:
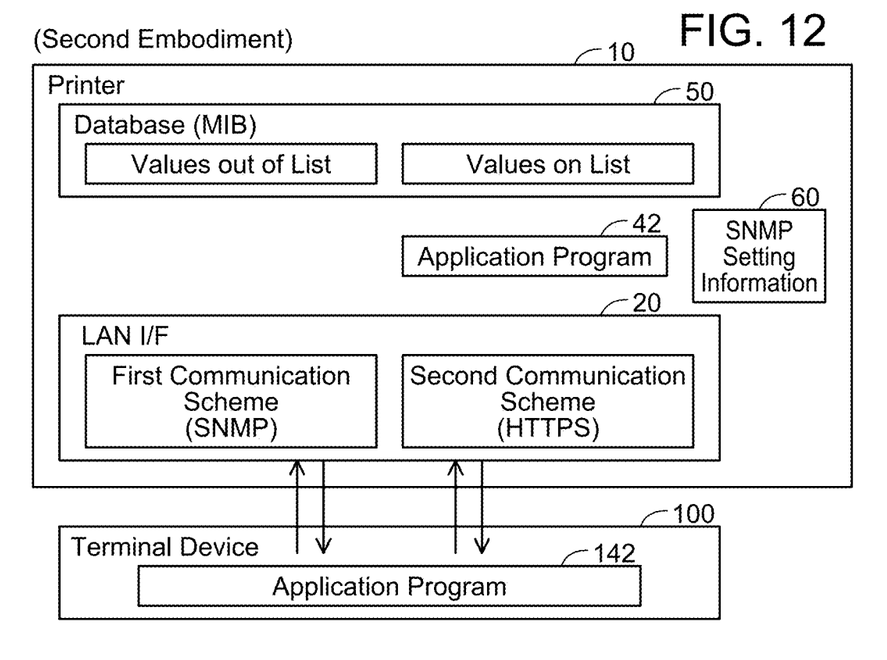
FIG. 12 illustrates communication protocols between the printer and the terminal device.

In the present embodiment, the memory 34 of the printer 10 stores SNMP setting information 60, as illustrated in FIG. 12. The SNMP setting information 60 is selectively set to either of "ON" indicating that the SNMP process according to the SNMP acquisition request (i.e., the process in S332) is permitted and "OFF" indicating that the SNMP process according to the SNMP acquisition request is prohibited. By default, the SNMP setting information 60 indicates "ON". By changing the SNMP setting information from "ON" to "OFF", communication using SNMP can be limited. In a modification, SNMP setting information 60 that includes setting information corresponding to the SNMP acquisition request and setting information corresponding to the writing request according to SNMP may be stored. In this modification, for example, the setting information corresponding to the SNMP acquisition request may indicate "ON (i.e., permission)" by default, and the setting information corresponding to the writing request according to SNMP may indicate "OFF" by default.

(Correspondence Relationships) The whitelist 52 and the SNMP setting information 60 are examples of "first list" and "setting information", respectively. The whitelist 152 is an example of "third list". The SNMP acquisition request is an example of "first acquisition request".

S304 and S306 in FIG. 14 are examples of "receive a writing request from a second communication device" and "write the setting value included in the writing request in the database", respectively. S224 in FIG. 13 is an example of "send a writing request to a first communication device".

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

(Modification 1) The "first communication device" is not limited to the printer 10 and may be, for example, a terminal device such as a desktop PC, a server, or the like. The "second communication device" is not limited to the terminal device 100 and may be a peripheral device such as the printer 10, a server, or the like.

(Modification 2) The "second communication scheme" may not include TLS but may include HTTP. In other words, the "writing request (and acquisition request)" may not use TLS (or SSL) but may use HTTP.

(Modification 3) The "authentication of a sender of the writing request" is not limited to user authentication and may be, for example, authentication of a device that sent a writing request. Further, the "second communication scheme" suffices by including at least one of encryption of communication data and authentication of a sender of a writing request, and the "second communication scheme" is not limited to HTTP and HTTPS so long as it is a protocol that includes at least one of encryption of communication data and authentication of a sender of a writing request.

(Modification 4) The printer 10 may not store the whitelist 52. Further, the terminal device 100 may not store the whitelist 152. In the present modification, at least one of the "first list", "second list", "third list", and "fourth list" may be omitted. Further, in the present modification, at least one of S42 in FIG. 7, S52 in FIG. 8, S142 in FIG. 10, and S152 in FIG. 11 may be omitted.

(Modification 5) S104 and S106 in FIG. 9 may not be executed. In the present modification, receiving the "second acquisition request" may be omitted.

(Modification 6) S132 in FIG. 9 may not be executed. In the present modification, the setting value stored in the database in association with each of the (L1-L2) OIDs may not be sendable to the second communication device by using the first communication scheme including SNMP.

(Modification 7) S331 and S332 in FIG. 14 may not be executed. In the present modification, receiving the "first acquisition request" may be omitted.

(Modification 8) In S332 of FIG. 14, an acquisition target OID may be selected using the whitelist 52.

(Modification 9) In the second embodiment, when a writing request according to SNMP is received by the printer 10 (NO in S331), one or more MIB values among all MIB values included in the writing request may be permitted to be written in the database 50.

(Modification 10) The SNMP setting information 60 may not be stored in the memory 34. In the present modification, the "setting information" may be omitted.

(Modification 11) S12 and S14 in FIG. 6 may not be executed. In the present modification, sending the "second acquisition request" may be omitted.

(Modification 12) S48 in FIG. 7 may not be executed. In the present modification, a setting value stored in the database in association with each of the (L3-L4) OIDs may not be receivable from the first communication device by using the first communication scheme including SNMP.

(Modification 13) S212 and S214 in FIG. 13 may not be executed. In the present modification, sending the "first acquisition request" may be omitted.

(Modification 14) In S212 in FIG. 13, an OID included in the SNMP acquisition request may be selected using the whitelist 152.

(Modification 15) In the embodiments above, the processes of FIGS. 6 to 11, FIG. 13, and FIG. 14 are implemented by the CPU 32 (or 132) executing the programs 40, 42 (or 140, 142). Instead of this, one or more of the processes may be implemented by hardware such as a logic circuit, etc.

What is claimed is:

1. A first communication device comprising:
    a Management Information Base (MIB) database configured to, for each of a plurality of object IDs (OIDs) of MIB, store an OID in association with a setting value;
    a memory configured to store a white list of predetermined OIDs;
    a first application layer configured to access the MIB database, which is a layer of a first communication scheme that includes Simple Network Management Protocol (SNMP);
    a second application layer configured to access the MIB database, which is an upper layer of a second communication scheme that does not include SNMP, the second communication scheme is different from the first communication scheme and includes at least one of encryption of communication data or authentication of a sender of a request; and
    a controller configured to:
    receive a writing request from a second communication device by using the second communication scheme, the writing request including the OID and the setting value and being a request for writing the setting value in the MIB database;
    in a case where the writing request is received from the second communication device by using the second communication scheme, select one or more writing target OIDs in the white list from amount a plurality of OIDs included in the writing request, where the writing request includes, for each of the one or more writing target OIDs selected, a writing target setting value associated with a writing target OID and access the MIB database via the second application layer to write in the MIB database, for each of the one or more writing target OIDs selected, the writing target setting value corresponding to the writing target OID in association with the writing target OID,
    where each setting value included in the writing request, corresponding to each of the OIDs not in the white list of predetermined OIDs, is not written in the MIB database; and
    wherein even in a case where a predetermined request for a writing request of the setting value is received from the second communication device by using the first communication scheme including SNMP, the writing of the setting value according to the predetermined request is not executed.

2. The first communication device according to claim 1, wherein
    the second communication scheme includes Hypertext Transfer Protocol Secure (HTTPS).

3. The first communication device according to claim 1, wherein
    the writing request includes plural pieces of set information, and
    the plural pieces of set information each indicate a set of one OID and one setting value.

4. The first communication device according to claim 1, wherein
    the controller is further configured to:
    receive a first acquisition request from the second communication device by using the first communication scheme including SNMP, the first acquisition request including an OID; and
    in a case where the first acquisition request is received from the second communication device, send, to the second communication device by using the first communication scheme, a setting value stored in the MIB database in association with the OID included in the first acquisition request.

5. The first communication device according to claim 4, wherein
    in a case where the first acquisition request is received from the second communication device, the controller is configured to access the MIB database via the first application layer and send, to the second communication device by using the first communication scheme, the setting value stored in the MIB database in association with the OID included in the first acquisition request.

6. The first communication device according to claim 4, wherein
    the OID included in the first acquisition request comprises two or more OIDs, and
    the controller is configured to send, for each of the two or more OIDs in the first acquisition request, a setting value stored in the MIB database in association with an OID in the first acquisition request, without using the white list of predetermined OIDs.

7. The first communication device according to claim 4, wherein
    the memory is further configured to store setting information related to SNMP, and
    the setting information includes a first default value for permitting a process according to the first acquisition request using the first communication scheme and a second default value for prohibiting a process according to the predetermined request using the first communication scheme.

8. The first communication device according to claim 1, wherein
    the controller is further configured to:
    receive a first acquisition request from the second communication device by using the second communication scheme, the first acquisition request including an OID; and
    in a case where the first acquisition request is received from the second communication device, access the MIB database via the second application layer and send, to the second communication device by using the second communication scheme, a setting value stored in the MIB database in association with the OID included in the first acquisition request.

9. The first communication device according to claim 8, wherein
    the controller is further configured to:
    in the case where the first acquisition request is received from the second communication device, select one or more acquisition target OIDs on the white list from among a plurality of OIDs included in the first acquisition request,
    send, for each of one or more acquisition target OIDs selected, a setting value stored in the MIB database in association with the acquisition target OID to the second communication device, and each setting value stored in the MIB database in association with OID which is included in the first acquisition request and is not on the white list is not send to the second communication device.

10. The first communication device according to claim 9, wherein each setting value stored in the MIB database in association with OID which is included in the first acquisition request and is not on the white list is sendable to the second communication device by using the first communication scheme including the SNMP.

11. The first communication device according to claim 1, wherein the writing of the setting value according to the predetermined request is not executed without referring to the white list.

* * * * *